HALOTHIOPHENES

Edgar M. Ilgenfritz and Robert P. Ruh, Midland, Mich., assignors to The Dow Chemical Company, Midland, Mich., a corporation of Delaware No Drawing. Application November 15, 1956
Serial No. 622,272

4 Claims. (Cl. 260—332.5)

This invention relates to fluorothiophenes and is more particularly concerned with perfluorothiophene and certain chloro and fluoro derivatives of thiophene. Specifically, the compounds of the present invention are perfluorothiophene, perfluoro and chlorofluorodihydrothiophenes, and, chlorofluorotetrahydrothiophenes. This invention is also concerned with a novel reaction using a butadiene and a sulfur halide to prepare the compounds of the present invention.

It is a principal object of the present invention to provide a novel chemical reaction for the preparation of fluorine containing thiophenes. Another object of the present invention is to provide certain novel organic compounds which are useful as fumigants. Still a further object of the present invention is to provide a cyclization, chlorination and dechlorination procedure for the preparation of perfluorothiophene. Other objects will become apparent hereinafter.

The first step of the process of the present invention is the thermal condensation of a fluorine-containing 1,3-butadiene with a sulfur halide. Suitable 1,3-butadienes which may be used have the formula

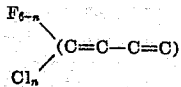

wherein $n$ is an integer from 0 to 4 inclusive, and include hexafluorobutadiene, monochloropentafluorobutadiene, both 1 and 2 chloro-substituted, dichlorotetrafluorobutadiene, 1,1-, 1,2-, 1,3-, 1,4-, 2,3-chloro-substituted, trichlorotrifluorobutadiene, 1,1,2-, 1,1,3-, 1,1,4-, 1,2,3-, 1,2,4-chlorosubstituted, tetrachlorodifluorobutadiene, 1,1-, 1,2-, 1,3-, 1,4-, 2,3-difluoro-substituted, etc. Suitable sulfur halides which may be used are sulfur chloride ($S_2Cl_2$), sulfur bromide ($S_2Br_2$), sulfur dichloride ($SCl_2$), and sulfur dibromide ($SBr_2$). These materials are thermally condensed to cause cyclization and rearrangement of the double bond. The condensation is conducted at a temperature of at least 100 degrees centigrade and preferably above 130 degrees centigrade but below that temperature at which substantial decomposition of the reactants and reaction products occurs. Autogenous pressure of the reaction is usually employed, although particular circumstances may require the use of lower or higher pressures. A mole ratio of one to one is preferred, although this too may be varied. Separation of the reaction product is readily accomplished by fractional distillation. The thermal condensation results in a fluorine-containing dihydrothiophene, having the formula:

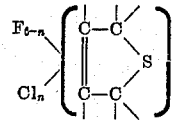

wherein $n$ is an integer from 0 to 4 inclusive. The particular product produced will be dependent on the particular starting material employed.

This dihydrothiophene may be chlorinated with chlorine gas in the presence of actinic radiation. The chlorine adds to the double bond of the dihydrothiophene. Excesses of chlorine are generally employed and a solvent which is inert to the reactants and reaction product under the conditions may be employed, if desired. Temperatures from 0 to 130 degrees centigrade may be used, however, room temperature is preferred. The product of the chlorination is a tetrahydrothiophene having the formula:

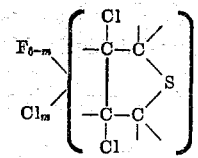

wherein $m$ is an integer from 0 to 4 inclusive.

This tetrahydrothiophene may be dehalogenated to a fluorine-containing thiophene by reaction in a dehalogenation solvent with zinc. The reaction is exothermic and requires that the initial mixing of the reactants be conducted rather slowly, or that suitable heat dissipating means be provided. While ethanol is the preferred dehalogenation solvent, methanol, isopropanol, propanol, dioxane, etc. may be employed, if desired. Usually, the reactants are mixed at room temperature, and, thereafter heated to reflux temperature. Separation of the reaction products may be readily accomplished by fractional distillation. Where the tetrahydrothiophene contains from 2 to 4 chlorine atoms with each carbon containing at least one fluorine atom, the product will be perfluorothiophene. Where the starting material contains 5 or 6 chlorine atoms, the product will be a chlorofluorothiophene.

The following examples are given to illustrate the present invention but are not to be construed as limiting.

Example 1

A 300 milliliter stainless steel reactor was charged with 135 grams of sulfur chloride ($S_2Cl_2$), the reactor closed, chilled to $-78$ degrees centigrade and evacuated. Thereafter, the reactor was charged with 222 grams of hexafluorobutadiene ($CF_2=CF-CF=CF_2$), and heated to 95 degrees centigrade for 15 hours and 150 degrees centigrade for 5 hours. The reaction mixture was distilled through a ½ inch diameter glass helice-packed column to yield 20.5 grams of recovered hexafluorobutadiene and 56 grams of hexafluoro-2,5-dihydrothiophene, boiling at 43–44.5 degrees centigrade at 743 millimeters of mercury pressure absolute. This compound has a refractive index $n_D^{25}$ of 1.3346, a specific gravity (25/4) of 1.559, and a molecular refraction of 25.73 determined, 25.80 theoretical. The structure has also been verified by nuclear magnetic resonance.

Example 2

One hundred ninety-five (195) parts of 1,4-dichlorotetrafluorobutadiene and 135 parts of sulfur chloride were reacted in manner similar to Example 1, the reaction mixture washed with dilute sodium hydroxide, the washed layer dried over calcium chloride and distilled to yield 40 parts of clear colorless $C_4F_4Cl_2S$, 2,5-dichlorotetrafluoro-2,5-dihydrothiophene, boiling at 110–116 degrees centigrade at 755 millimeters of mercury pressure absolute. This compound has a refractive index $n_D^{25}$ of 1.3992, a specific gravity (25/4) of 1.645, and a molecular refraction of 35.75 determined, 35.34 theoretical.

In a manner similar to that of the foregoing Examples 1 and 2, other fluorine-containing dihydrothiophenes may be prepared, such as, for example, 2,3-dichlorotetrafluoro-2,5-dihydrothiophene,
2,4-dichlorotetrafluoro-2,5-dihydrothiophene,
2,2-dichlorotetrafluoro-2,5-dihydrothiophene,
3,4-dichlorotetrafluoro-2,5-dihydrothiophene,
2,3,4,5-tetrachlorodifluoro-2,5-dihydrothiophene,
2,2,5,5-tetrachlorodifluoro-2,5-dihydrothiophene,
2,2,3,4-tetrachlorodifluoro-2,5-dihydrothiophene,
2,2,3,5-tetrachlorodifluoro-2,5-dihydrothiophene,
2,2,4,5-tetrachlorodifluoro-2,5-dihydrothiophene,
2-chloropentafluoro-2,5-dihydrothiophene,
3-chloropentafluoro-2,5-dihydrothiophene,
2,2,3-trichlorotrifluoro-2,5-dihydrothiophene,
2,3,4-trichlorotrifluoro-2,5-dihydrothiophene,
2,2,4-trichlorotrifluoro-2,5-dihydrothiophene,
2,2,5-trichlorotrifluoro-2,5-dihydrothiophene, etc. by starting with an appropriate chlorofluorobutadiene-1,3.

Example 3

Eighty-four and four tenths parts of 2,5-dichlorotetrafluoro-2,5-dihydrothiophene were placed in a Claisen flask, and chlorine was bubbled through the liquid for 18 hours while the flask was irradiated with a G.E. 275 watt sun lamp. Distillation of the product yielded 2,3,4,5-tetrachlorotetrafluoro-2,3,4,5-tetrahydrothiophene, distilling at 109–110 degrees centigrade at 100 millimeters of mercury pressure absolute, for a 75 percent conversion. This compound has a refractive index $n_D^{25}$ of 1.4644, a specific gravity (25/4) of 1.779, and a molecular refraction of 46.15 determined, 46.31 theoretical.

In a manner similar to that of Example 3, other chlorofluorotetrahydrothiophenes may be prepared such as, for example, 2,2,3,4-tetrachlorotetrafluoro-2,3,4,5-tetrahydrothiophene,
3,3,4,4-tetrachlorotetrafluoro-2,3,4,5-tetrahydrothiophene,
3,3,4,5-tetrachlorotetrafluoro-2,3,4,5-tetrahydrothiophene,
3,4-dichlorohexafluoro-2,3,4,5-tetrahydrothiophene,
3,3-trichloropentafluoro-2,3,4,5-tetrahydrothiophene,
2,3,4-trichloropentafluoro-2,3,4,5-tetrahydrothiophene,
2,2,3,3,4-pentachlorotrifluoro-2,3,4,5-tetrahydrothiophene,
2,2,3,3,4,4 - hexachlorodifluoro - 2,3,4,5 - tetrahydrothiophene, etc. by chlorinating an appropriate chlorofluorodihydrothiophene.

Example 4

An equivolume mixture (84.4 parts) of 2,3,4,5-tetrachlorotetrafluoro-2,3,4,5-tetrahydrothiophene and absolute ethanol was added over a period of one-half hour to 36 parts of mossy zinc in 35 parts of absolute ethanol. After the exothermic addition had been completed, the reaction mixture was refluxed for 24 hours, washed with water, dried, and then distilled. There was thus obtained perfluorothiophene, $C_4F_4S$, boiling at 68 degrees centigrade at 754 millimeters of mercury absolute. This compound has a refractive index $n_D^{25}$ of 1.3992, a specific gravity (25/4) of 1.546 and a molecular refraction 25.00 determined, 25.00 theoretical. The identification of perfluorothiophene has been verified by nuclear magnetic resonance.

Example 5

Each of the compounds above described was tested as a fumigant by exposing black carpet beetle larva and confused flour beetle adults to the action of varying amounts of the compound, the exposure lasting 16 hours and being carried out at 80 degrees Fahrenheit. The following table records the results.

| Compound | Black Carpet Beetle | | Confused Flour Beetle | |
|---|---|---|---|---|
| | Amount | Percent Kill | Amount | Percent Kill |
| $C_4F_6S$ | 1 | 100 | 1 | 100 |
| | ¼ | 85 | ¼ | 0 |
| $C_4F_4Cl_2S$ | 1 | 100 | 1 | 100 |
| | ¼ | 0 | ¼ | 6 |
| $C_4F_4Cl_4S$ | 1 | 100 | 1 | 100 |
| | ¼ | 0 | ¼ | 3 |
| $C_4F_4S$ | 1 | 97 | 1 | 100 |
| | ¼ | 0 | ¼ | 0 |

The above amounts are recited on the basis of pounds per 1000 cubic feet of space fumigated.

Various modifications may be made in the present invention without departing from the spirit or scope thereof, and it is to be understood that we limit ourselves only as defined in the appended claims.

We claim:
1. Perfluorothiophene.
2. Hexafluoro-2,5-dihydrothiophene.
3. A process which comprises: heating at a temperature above 100° C., but below that temperature at which substantial decomposition of the reactants and reaction products occurs, perfluorobutadiene with a sulfur halide selected from the group consisting of sulfur chloride, sulfur bromide, sulfur dichloride and sulfur dibromide, and, separating hexafluorodihydrothiophene from the reaction mixture.
4. A process which comprises: heating at a temperature above 100° C., but below that temperature at which substantial decomposition of the reactants and reaction products occurs, 1,4-dichlorotetrafluorobutadiene with a sulfur halide selected from the group consisting of sulfur chloride, sulfur bromide, sulfur dichloride, and sulfur dibromide, chlorinating the fluorochlorodihydrothiophene thus formed by contacting, in the presence of actinic radiation, said dihydrothiophene with chlorine gas, and dehalogenating the resulting chlorofluorodihydrothiophene by contact with zinc in the presence of a dehalogenation solvent and, separating perfluorothiophene from the reaction mixture.

References Cited in the file of this patent

UNITED STATES PATENTS

| | | |
|---|---|---|
| 2,504,084 | Norris et al. | Apr. 11, 1950 |
| 2,599,350 | Rudel et al. | June 3, 1952 |
| 2,625,553 | Pines et al. | Jan. 13, 1953 |
| 2,702,306 | Gall et al. | Feb. 15, 1955 |
| 2,746,974 | Inman | May 22, 1956 |

OTHER REFERENCES

Coonradt et al.: Journal of the American Chemical Society, vol. 74, pp. 163–5 (1952).

Backer et al.: Recueil des Travaux Chimiques des Pays-Bas, vol. 54, pp. 52–56 (1935).